SAMPLE TAKING APPARATUS

Filed Oct. 4, 1952 11 Sheets-Sheet 1

INVENTOR.
JACQUES H. CASTEL
BY
Mason, Kolehmainen, Rathburn & Wyss
ATTORNEYS

SAMPLE TAKING APPARATUS

Filed Oct. 4, 1952 11 Sheets-Sheet 2

INVENTOR.
JACQUES H. CASTEL
BY Mason, Kolehmainen, Rathburn & Wyss
ATTORNEYS

INVENTOR.
JACQUES H. CASTEL
BY
Mason, Kolehmainen, Rathburn & Wyss
ATTORNEYS

INVENTOR.
JACQUES H. CASTEL
BY
Mason, Kolehmainen, Rathburn & Wyss
ATTORNEYS

INVENTOR.
JACQUES H. CASTEL
BY
Mason, Kolehmainen, Rathburn & Wyss
ATTORNEYS

Dec. 15, 1959 J. H. CASTEL 2,917,280

SAMPLE TAKING APPARATUS

Filed Oct. 4, 1952 11 Sheets-Sheet 6

INVENTOR.
JACQUES H. CASTEL
BY
Mason, Kolehmainen, Rathburn & Wyss
ATTORNEYS

Dec. 15, 1959 J. H. CASTEL 2,917,280

SAMPLE TAKING APPARATUS

Filed Oct. 4, 1952 11 Sheets-Sheet 7

INVENTOR.
JACQUES H. CASTEL
BY
Mason, Kolehmainen, Rathburn & Wyss
ATTORNEYS

INVENTOR.
JACQUES H. CASTEL
BY
Mason, Kolehmainen, Rathburn & Wyss
ATTORNEYS

INVENTOR.
JACQUES H. CASTEL
BY
Mason, Kolehmainen, Rathburn & Wyss
ATTORNEYS

SAMPLE TAKING APPARATUS

Filed Oct. 4, 1952

INVENTOR.
JACQUES H. CASTEL
BY
Mason, Kolehmainen, Rathburn & Wyss
ATTORNEYS

SAMPLE TAKING APPARATUS

Filed Oct. 4, 1952 11 Sheets-Sheet 11

INVENTOR.
JACQUES H. CASTEL
BY
Mason, Kolehmainen, Rathburn & Wyss
ATTORNEYS

United States Patent Office 2,917,280
Patented Dec. 15, 1959

2,917,280

SAMPLE TAKING APPARATUS

Jacques H. Castel, Houston, Tex., assignor, by mesne assignments, to PGAC Development Company, Houston, Tex., a corporation of Texas Application October 4, 1952, Serial No. 313,181

11 Claims. (Cl. 255—1.4)

The present invention relates to core taking or sample taking apparatus, more particularly to side wall sample taking tools for taking samples of formations surrounding boreholes, and the invention has for an object the provision of rugged and reliable tools and apparatus of this character.

Side wall sampling tools adapted to be lowered into a borehole to the level of the formation to be investigated and including explosive means for shooting a hollow core taking projectile into the formation, and retrieving means for withdrawing the projectile and the contained core from the formation have heretofore been proposed. However, such prior sample taking apparatus has been difficult to load, dangerous to operate, limited as to the number of samples that may be taken without withdrawing the tool from the borehole for reloading, and in some cases, unreliable in that proper penetration of the formation by the projectile has not been uniformly obtained.

It is a further object of the invention, therefore, to provide a side wall sample taker that may be readily and safely loaded prior to introduction of the tool into the borehole.

Another object of the invention is the provision of a unitary assembly for use in a sample taking tool comprising a preassembled projectile, retrieving cable, and an explosive charge that may be quickly and safely assembled in a gun block.

Still another object is the provision of a unitary assembly of the type indicated in which the assembly is secured in the bore of the block by means of a single fastening device accessible from the rear of the bore in the gun block.

Still another object of the invention is to provide a unitary assembly of the type indicated in which the fastening device for securing the assembly in the gun also firmly secures the retrieving cable to the block.

It is a still further object of the invention to provide an improved sample taking tool which is capable of selectively taking a large number of samples in a single traverse of the borehole and in which the sample taking operation may be accurately controlled from the surface of the earth.

An additional object of the invention is to provide means for properly positioning the block of the tool or gun in the borehole to provide a proper standoff distance for the sample taking projectile.

In carrying out the invention in one form, a sample taking tool assembly is provided, including a hollow projectile having an open front end and a closed rear end to which is secured a cup-like charge container for housing an explosive charge and a flexible retrieving cable, one end of the cable being secured to the projectile. The container also encloses a cable retaining member to which the other end of the retrieving cable is secured, and means are provided accessible from the rear of the gun block in which the assembly is mounted for securing the cable retaining member and the container to the block, the connection between the projectile and the container being such that the projectile is separated from the container upon explosion of the charge contained therein. The projectile carries at its open end a cutting ring of larger external diameter than the projectile itself, the cutting ring being secured to the projectile by shearable means adapted to shear when the projectile is fired into the formation so that upon withdrawal of the projectile from the formation, the cutting ring will remain therein.

In one embodiment of the invention, a plurality of gun blocks are provided, each adapted to receive a large number of preassembled tool assemblies, and means are provided, controllable from the surface of the earth for firing selected projectiles in selected blocks as desired. In order to obtain maximum penetration of the formations by the sample taking projectiles, means are provided for engaging the wall of the borehole to position the gun blocks so that the projectiles are in substantially perpendicular relation to the wall to be sampled and at a proper standoff distance, the positioning means being controllable from the surface of the earth so that damage will not occur to this means during lowering and withdrawal of the tool from the bore.

For a more complete understanding of the invention, reference should now be had to the drawings in which.

Figures 6, 7, 26:
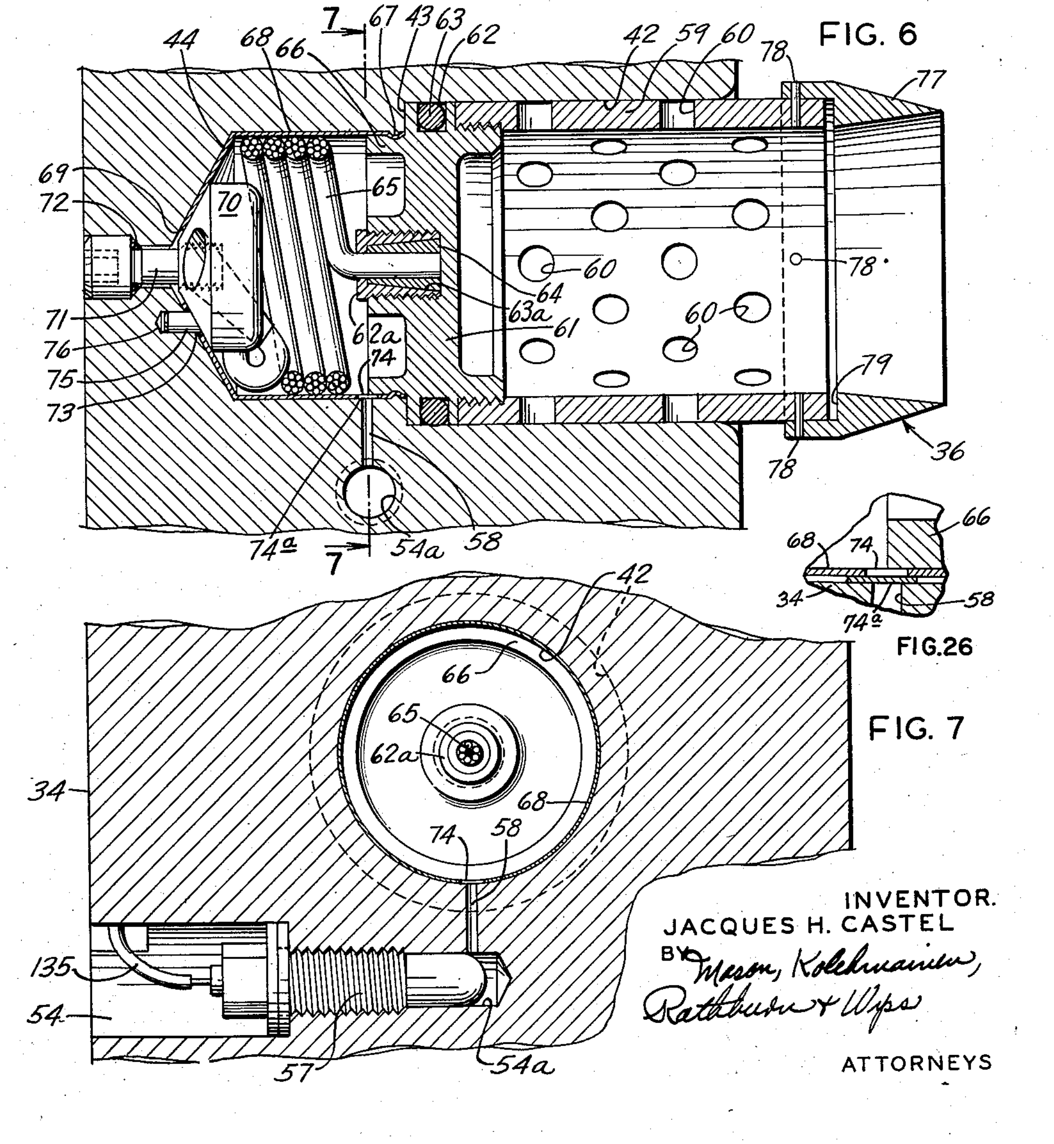
Fig. 6 is a sectional view upon a somewhat larger scale, showing one of the sample taking tool assemblies positioned in one of the gun blocks.
Fig. 7 is a fragmentary sectional view taken along the line 7—7 of Fig. 6, showing an igniter in elevation.
Figure 15:
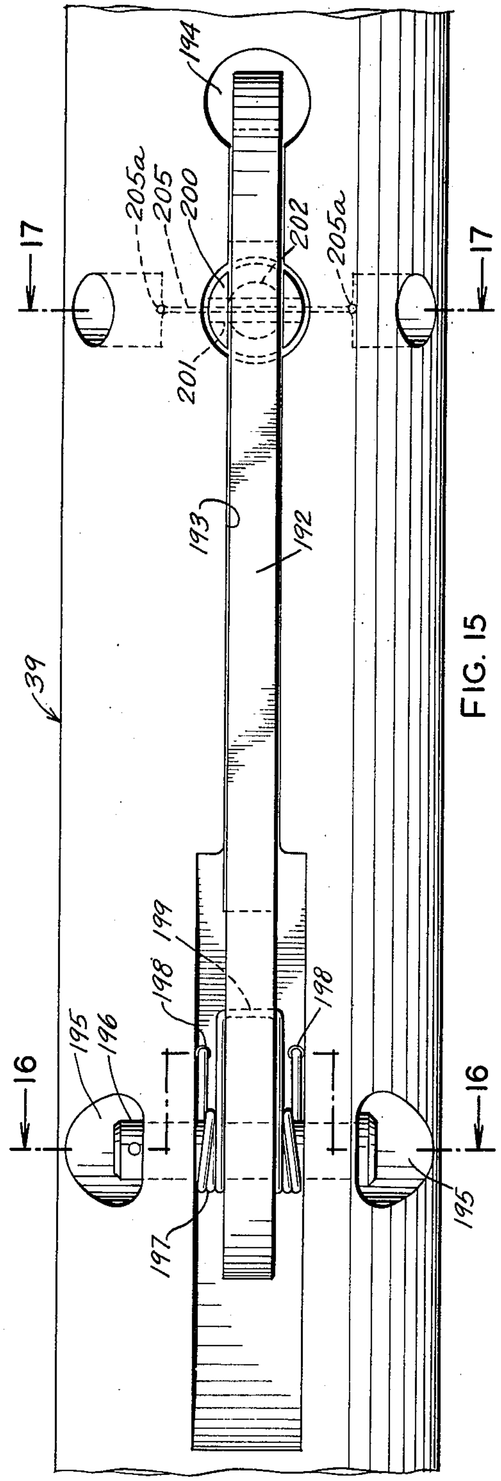
Fig. 15 is a side elevational view of the bull plug and positioning means shown in Fig. 14.
Figure 17:
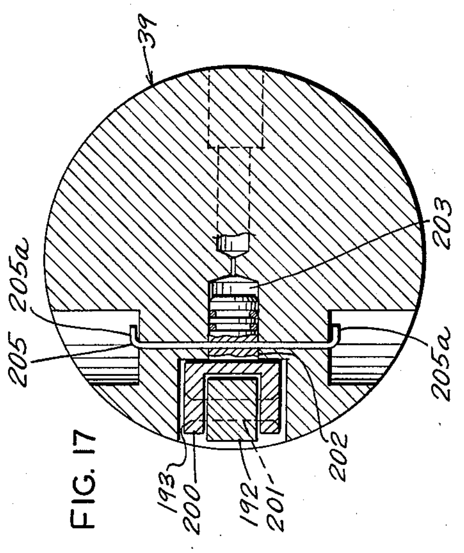
Figure 16:
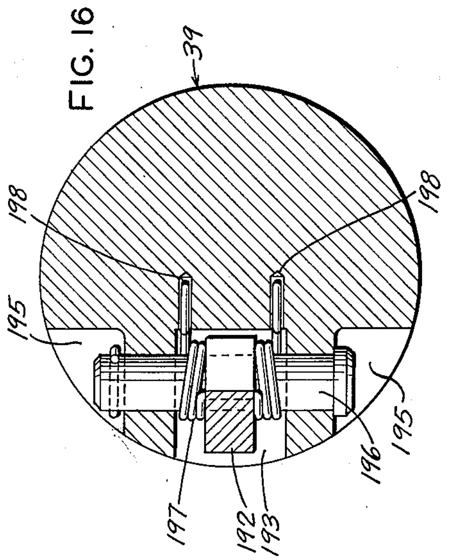
Figure 18:
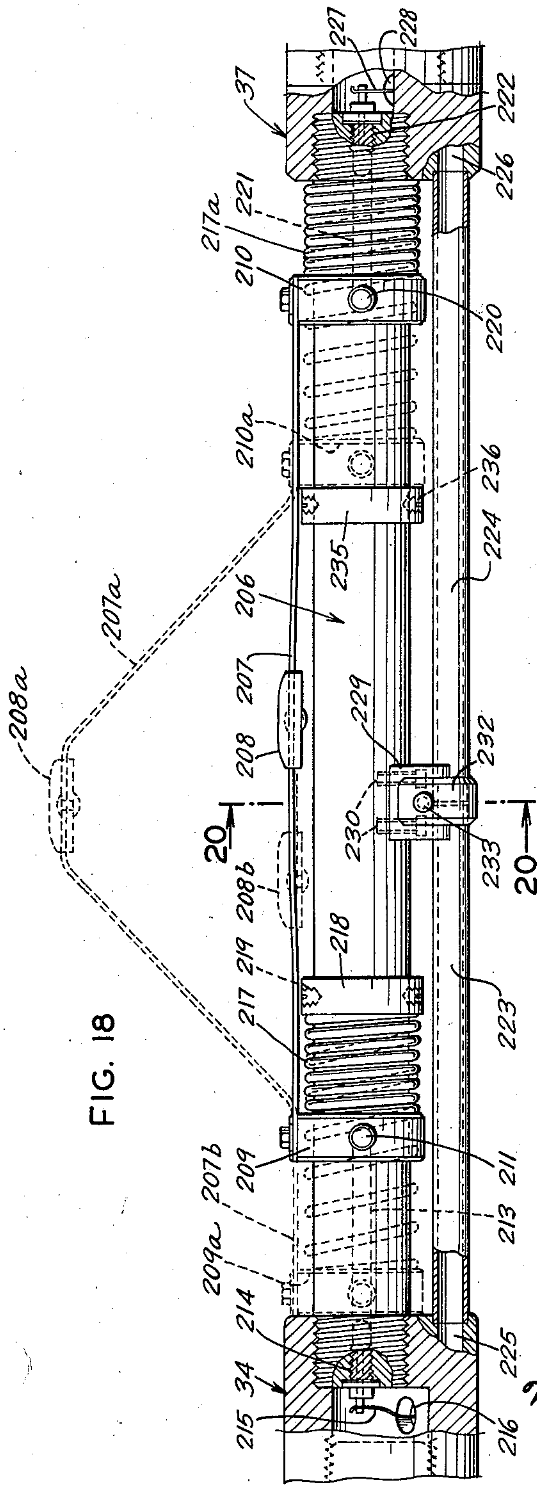
Figures 19, 20:
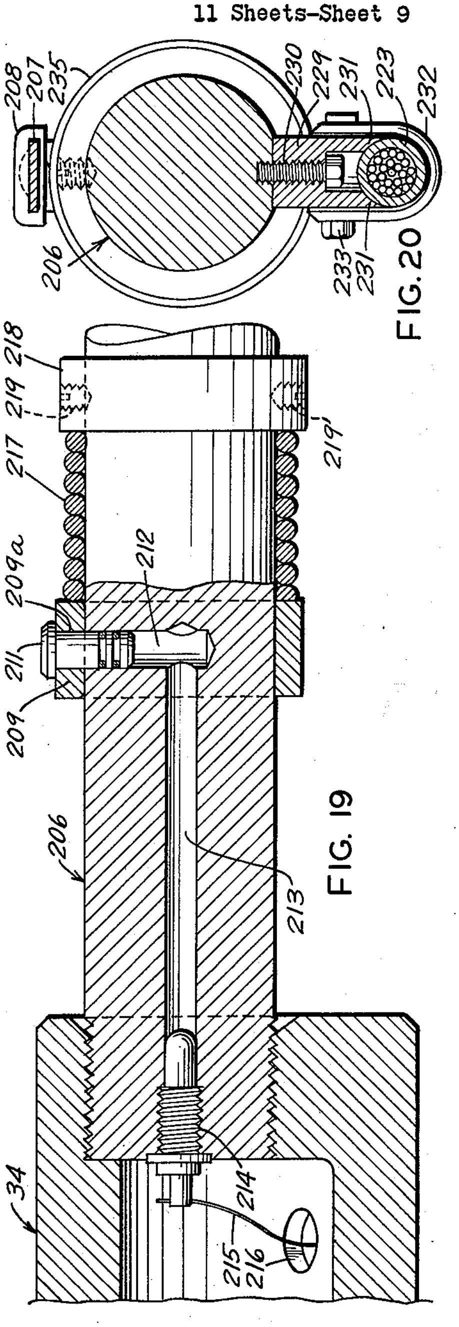
Figures 21, 22:
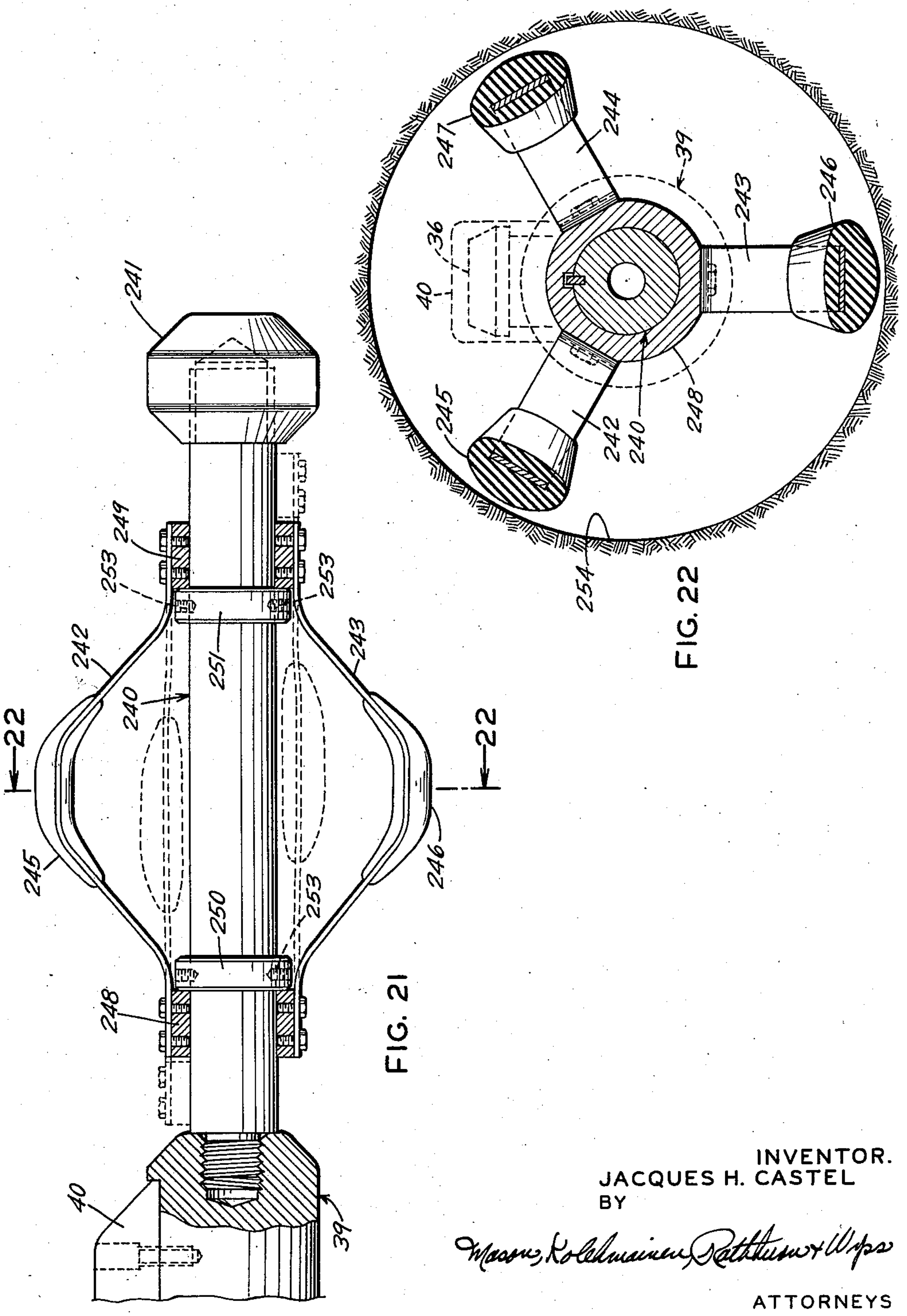
Figures 23, 24, 25:
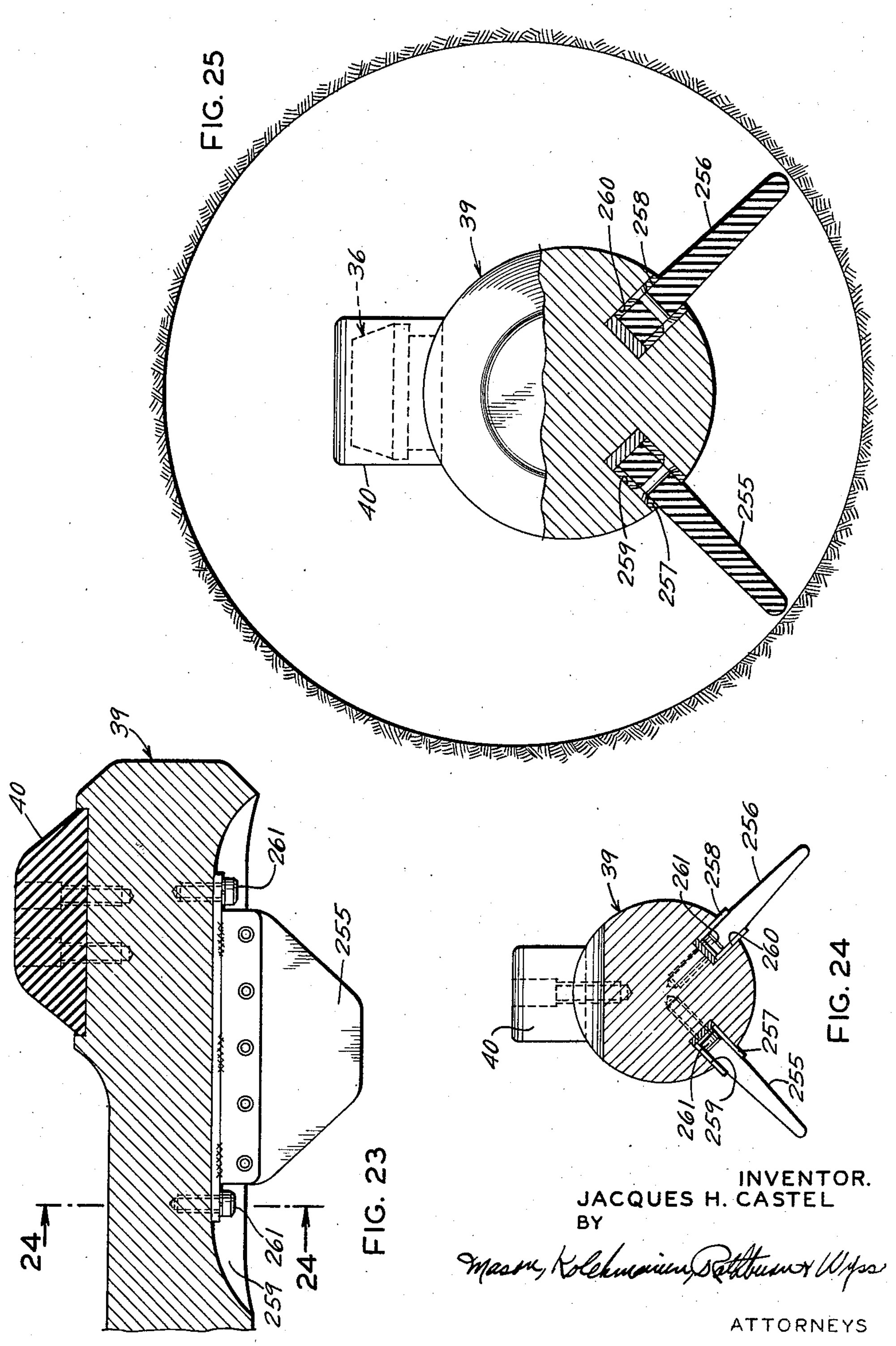

Figs. 16 and 17 are detailed sectional views respectively taken along the lines 16—16 and 17—17 of Fig. 15;

Fig. 18 is a side elevational view showing another embodiment of the present invention upon which the positioning means is carried on a mandrel disposed between the upper and lower gun blocks;

Fig. 19 is a fragmentary sectional view showing the lefthand end of the positioning means of Fig. 18;

Fig. 20 is a detailed sectional view taken substantially along the line 20—20 of Fig. 18;

Fig. 21 is an elevational view, partly in section, showing another form of positioning means carried on a mandrel depending from the lower end of the bull plug;

Fig. 22 is a sectional view taken substantially along the line 22—22 of Fig. 21, showing the manner in which the positioning means is effective to position the gun in the borehole during a sample taking operation;

Fig. 23 is a fragmentary sectional view of a bull plug provided with still another form of positioning means;

Fig. 24 is a sectional view taken substantially along the line 24—24 of Fig. 23;

Fig. 25 is a bottom view, partly in section, of a sample taking apparatus provided with the positioning means of Figs. 23 and 24; and Fig. 26 is a fragmentary sectional view of the charge receiving container portion of the sample taking tube assembly shown in Fig. 6.

Figures 1, 2, 3:
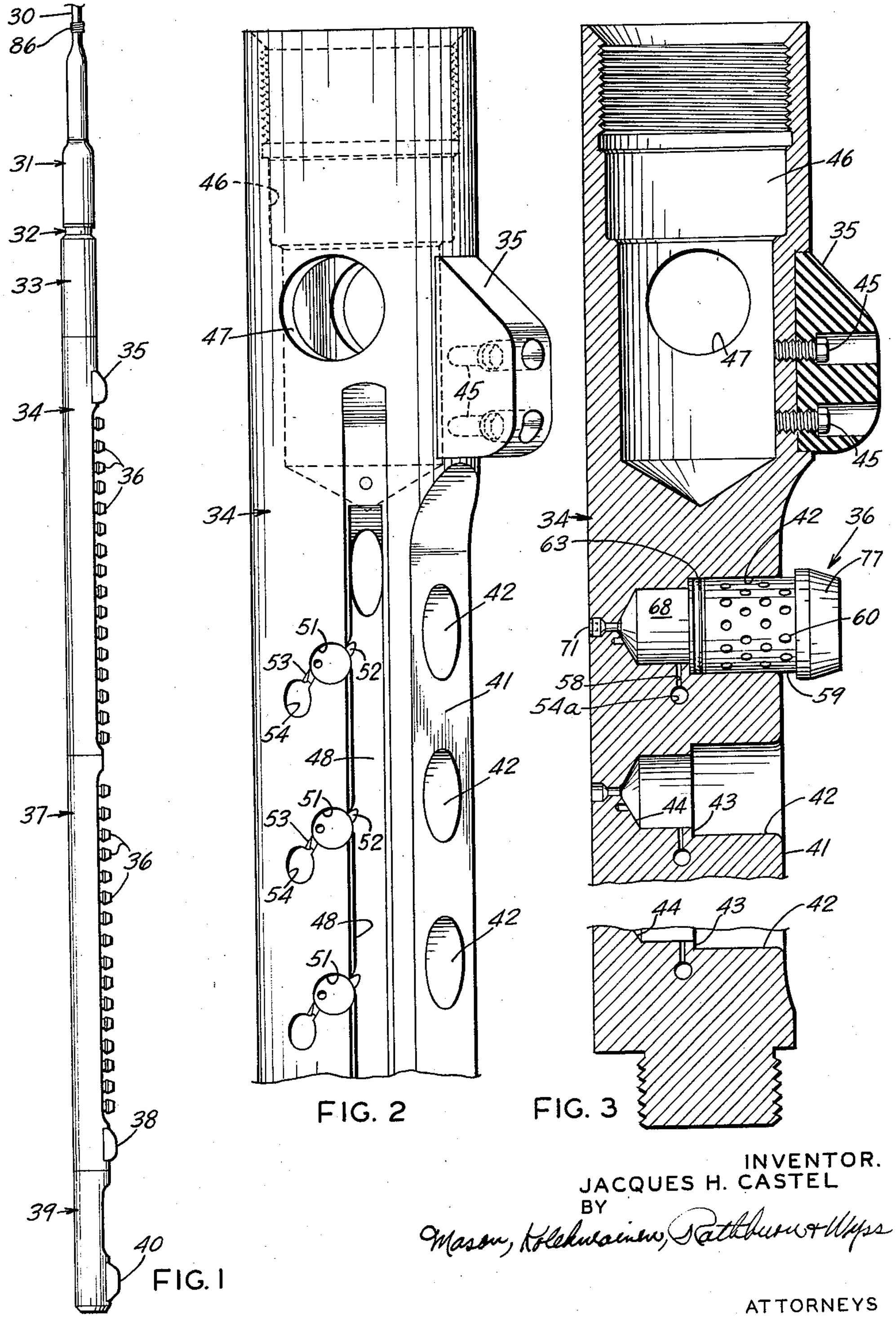
Fig. 1 is an elevational view of a complete sample taking apparatus embodying the present invention.
Fig. 2 is a fragmentary elevational view of the upper gun block embodied in the apparatus of Fig. 1 before being fitted with the sample taking tool assemblies and the control means for firing the individual sample taking tools.
Fig. 3 is an elevational sectional view taken substantially through the center line of Fig. 1, showing one of the tool assemblies positioned in one of the projectile receiving bores.

Referring first to Fig. 1 of the drawing, the sample taking apparatus is shown as suspended from the usual armored cable 30, the lower end of which is connected through a cable head 31 and an adapter 32 to the upper end of a controller housing 33 to which is connected an upper gun block 34. The gun block 34 is provided adjacent its upper end with a suitable bumper 35, preferably formed of soft metal so as to be somewhat resilient and carries a plurality of sample taking tools 36 disposed in suitable transverse bores formed in the gun block, as will be more fully described hereinafter. Suitably secured to the lower end of the upper gun block 34 is a lower gun block 37 which likewise carries a plurality of sample taking tools 36 and which is provided adjacent its lower end with a bumper 38. Connected to the lower end of the lower gun block 37 is a suitable bull plug 39 which carries at its lower end a bumper 40.

As shown in Figs. 2 and 3, the upper gun block 34 is provided with a flattened surface 41 from which extend a plurality of transverse bores 42, which extend entirely through the gun block and are formed to provide a plurality of shoulders or steps 43 and 44 so that the diameter of each of the bores decreases from the front to the rear ends thereof. The resilient bumper 35 is secured to the upper gun block 34 in alignment with the flattened surface 41 by means of suitable cap screws 45.

Figure 4:
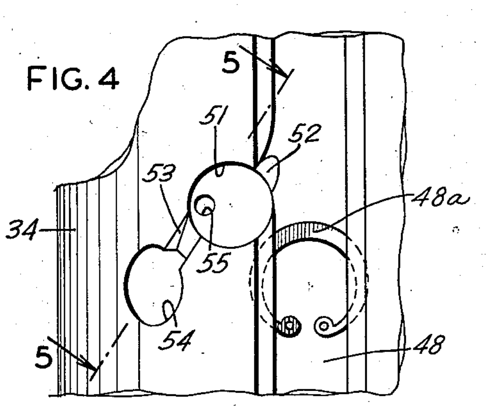
Fig. 4 is a fragmentary detailed view of a portion of the upper gun block shown in Fig. 2.
Figure 5:
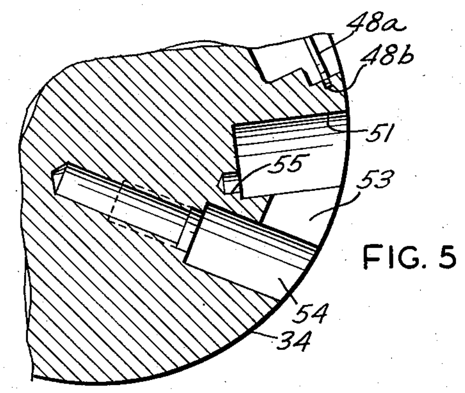
Fig. 5 is a fragmentary sectional view taken along the line 5—5 of Fig. 4.

As shown, the upper end of the upper gun block 34 is formed to provide a hollow conductor receiving chamber 46 to receive a plurality of conductors which extend from the controller housing 33, and transversely extending apertures 47 are provided which permit the control conductors to be brought out to the outside of the gun block. Extending along one side of the gun block 34 substantially immediately below the aperture 47 on the corresponding side of the gun block is a conductor receiving channel or groove 48, and it will be understood, as shown diagrammatically in Fig. 8, that the opposite side of the gun block 34 is provided with a similar conductor receiving channel 49, the channel 49, however, extending all the way to the bottom of the gun block 34 for communication with a similar conductor receiving channel 50 formed in the lower gun block 37. Suitable expansible rings 48*a* (Fig. 4) adapted to be received in positioning grooves 48*b* (Fig. 5) may be employed to retain the conductors in the channels 48, 49, and 50. Disposed in spaced relation along one side of the conductor channel 48 are a plurality of terminal receiving apertures 51 which are connected with the channel 48 by suitable passageways 52 and which communicate through other passageways 53 with suitable detonator igniter or receiving apertures 54. As shown best in Fig. 5, the bottom wall of each of the terminal receiving apertures 51 is provided with a small drilled hole 55 for receiving a positioning pin (not shown) carried by the terminal blocks 56 (Fig. 8) in order to insure that the terminals on the block will be properly positioned relative to the passageways 52 and 53 when the terminal blocks and the detonators or igniters are positioned in the apertures 51 and 54 and connected to the electric control circuit as illustrated diagrammatically in Fig. 8. As shown in Fig. 7, the detonator apertures 54 are threaded to receive suitable detonator caps 57, and the spaces 54*a* in the apertures 54 below the detonator caps are connected by suitable passageways 58 to associated ones of the bores 42 for a purpose to be more fully described hereinafter. It will be understood that the arrangement of the terminal receiving apertures and igniter or detonator receiving apparatus with respect to the conductor channel 50 of the lower block is the same as the arrangement of these apertures with respect to the conductor channel 48 of the upper block.

Referring now particularly to Fig. 6 of the drawings, each of the preassembled sample taking tool assemblies 36 which are provided in accordance with the present invention consists of a hollow tubular barrel 59 adapted to fit within the larger front portion of the transverse bore 42, the tube 59 having the side walls thereof provided with a plurality of apertures 60 for permitting the outward flow of liquid or mud from the barrel when the projectile is forced into the side wall of the earth formation to take a sample therefrom. Threadedly secured to the rear end of the barrel 59 is a plug or closure member 61 having an annular groove 62 formed in the outer surface thereof for receiving an O ring 63 which provides a seal between the bore 42 and the projectile formed by the barrel 59 and the plug 61. As shown, the plug 61 is also provided with a centrally threaded aperture for receiving a threaded securing member 62*a* having a tapered opening 63*a* therein for receiving a wedge 64 that is brazed or otherwise suitably secured to one end of a projectile retrieving cable 65. After the cable has been pulled through the tapered aperture 63*a* to the point where the wedge 64 is engaged in this aperture, the securing member 62*a* may be threaded into the plug 61 permanently to secure the cable 65 to the plug 61.

The rear wall of the plug 61 (as shown) is also provided with an annular flange 66 having an annular indentation 67 therein into which is pressed an upper edge portion of an explosive receiving container 68 which may be formed of any suitable material of relatively light gauge. The rear wall of the explosive container 68 is tapered (as shown) to engage the step or shoulder 44 of the bore 42, and this rear wall is provided with a centrally disposed aperture 69. The retrieving cable 65 is adapted to be coiled within the cup-like container 68 and the rear end of the cable 65 is secured by means of another wedge-type connection to a cable retaining member 70, the rear wall of which is tapered to engage the tapered rear wall of the container 68. The cable retaining member 70 is threaded (as shown) to receive a retaining screw 71 which may be inserted through the rear of the transverse bore and which, when tightened will permanently secure the cable retaining member 70 in the bore 42 and will fix the entire projectile assembly 36 within the bore. A suitable O-ring 72 may be employed (as shown) to provide a suitable seal between the securing screw 71 and the rear portion of the transverse bore 42 through which the securing screw extends.

As shown, the cup-shaped container 68 is provided with a pair of apertures 73 and 74, respectively disposed in the bottom and side walls of the container, the aperture 73 being adapted to receive a positioning pin 75 which is formed on the retaining member 70 and extends into a suitably positioned drilled hole 76 in the wall 44 of the bore and which functions to position the aperture 74 in alignment with one of the passageways 58 leading from the detonating chamber 54*a*.

After the charge receiving container, the cable, and the cable retaining member have been assembled on the plug 61 (as shown), the container 68 may be filled with a suitable powder charge and a small piece of frangible material 74*a* (Fig. 26) such as adhesive tape, may be placed over the opening 74 to retain the powder in the container 68 until after the assembly has been positioned in the block. This frangible covering, while preventing spilling of the powder charge, will not prevent the passage of hot gases from the detonating chamber through the passageway 58 into the explosive container 68 to effect ignition of the main charge.

In addition to the above described elements which may be preassembled and easily and quickly installed in the gun blocks, the tool assembly includes a cutting ring 77 which is carried on the outer end of the tubular barrel 59 and secured in position thereon by a plurality of shear pins 78, the cutting ring 77 being provided with an annular shoulder 79 which is directly in front of, but in spaced relation to, the front end of the barrel 59 when the shear pins are assembled in aligned apertures in the barrel and the cutting ring. It will be noted that the cutting ring 77 has a larger external diameter than the barrel 59, and thus, when the sample taking barrel 59 is fired into the side wall by explosion of the charge contained in the charge container 68, the cutting ring 77 will make a hole in the surface to be sampled which is larger than the barrel 59, thereby facilitating withdrawal of the barrel 59 from the formation with a sample contained therein. The shear pins 78 are adapted to shear when the explosive charge is fired. Thus, when the barrel and its contained sample are withdrawn from the formation, the cutting ring 77 will remain therein. It will be understood that the projectile assembly thus far described is not limited in its application to the use of hollow projectile bodies for sample taking purposes and that any suitable type of projectile body may be substituted for the hollow barrel 59 and its closure plug 61. Furthermore retrieving cable 65 may be omitted if retrieving of the projectile is not desired as, for example, where the gun is to be used as a perforator.

Figure 9:
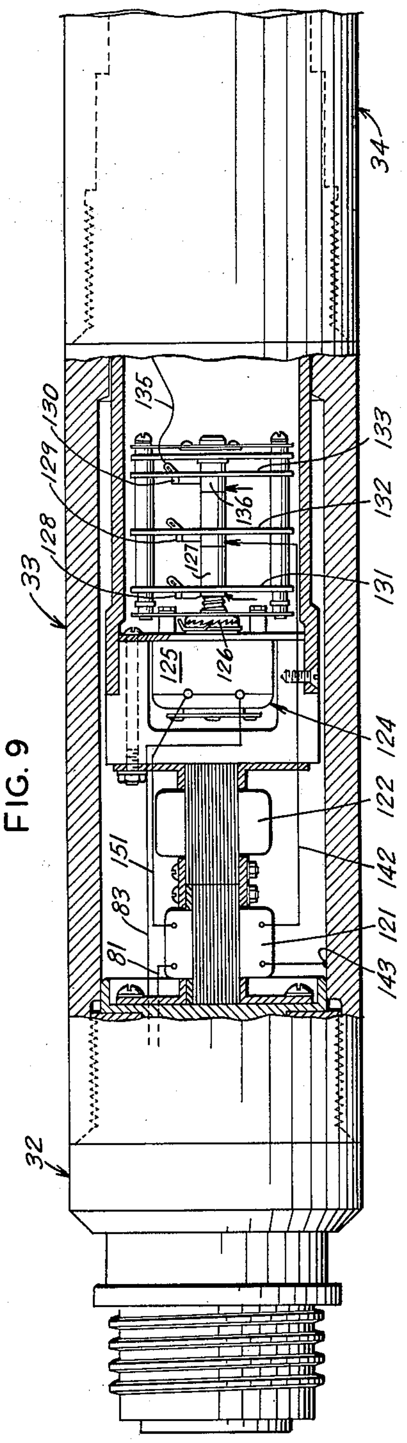
Fig. 9 is an elevational view of the controller embodied in the apparatus of Fig. 1, a portion of one wall of the controller being broken away in order to illustrate the control apparatus contained therein.
Figure 8:
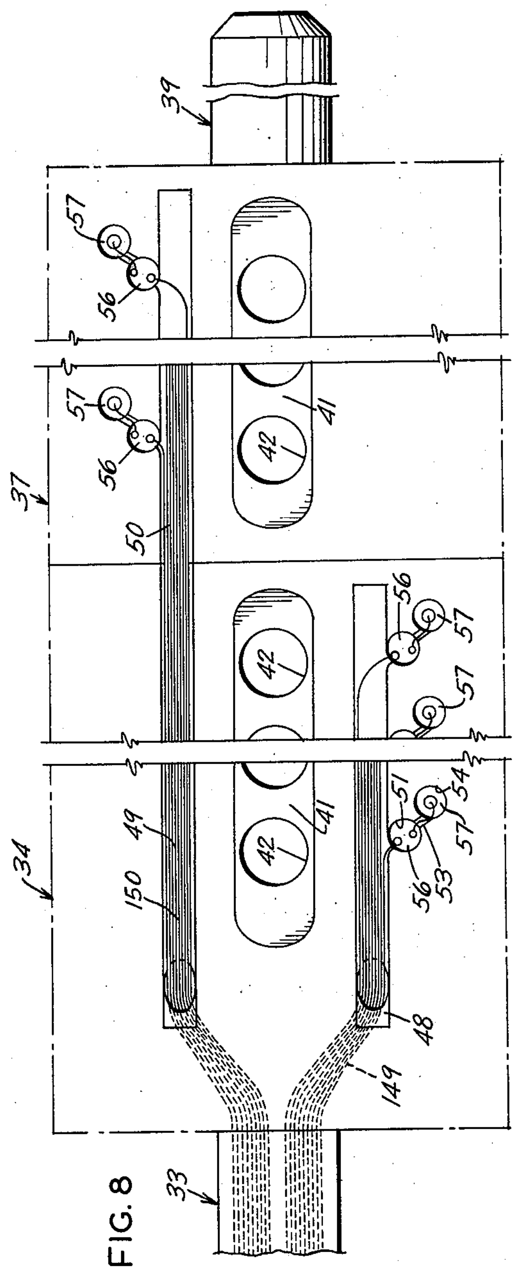
Fig. 8 is a diagrammatic view of the upper and lower gun blocks showing the surfaces of these blocks developed in order more clearly to illustrate the wiring arrangement.
Figures 9A, 10:
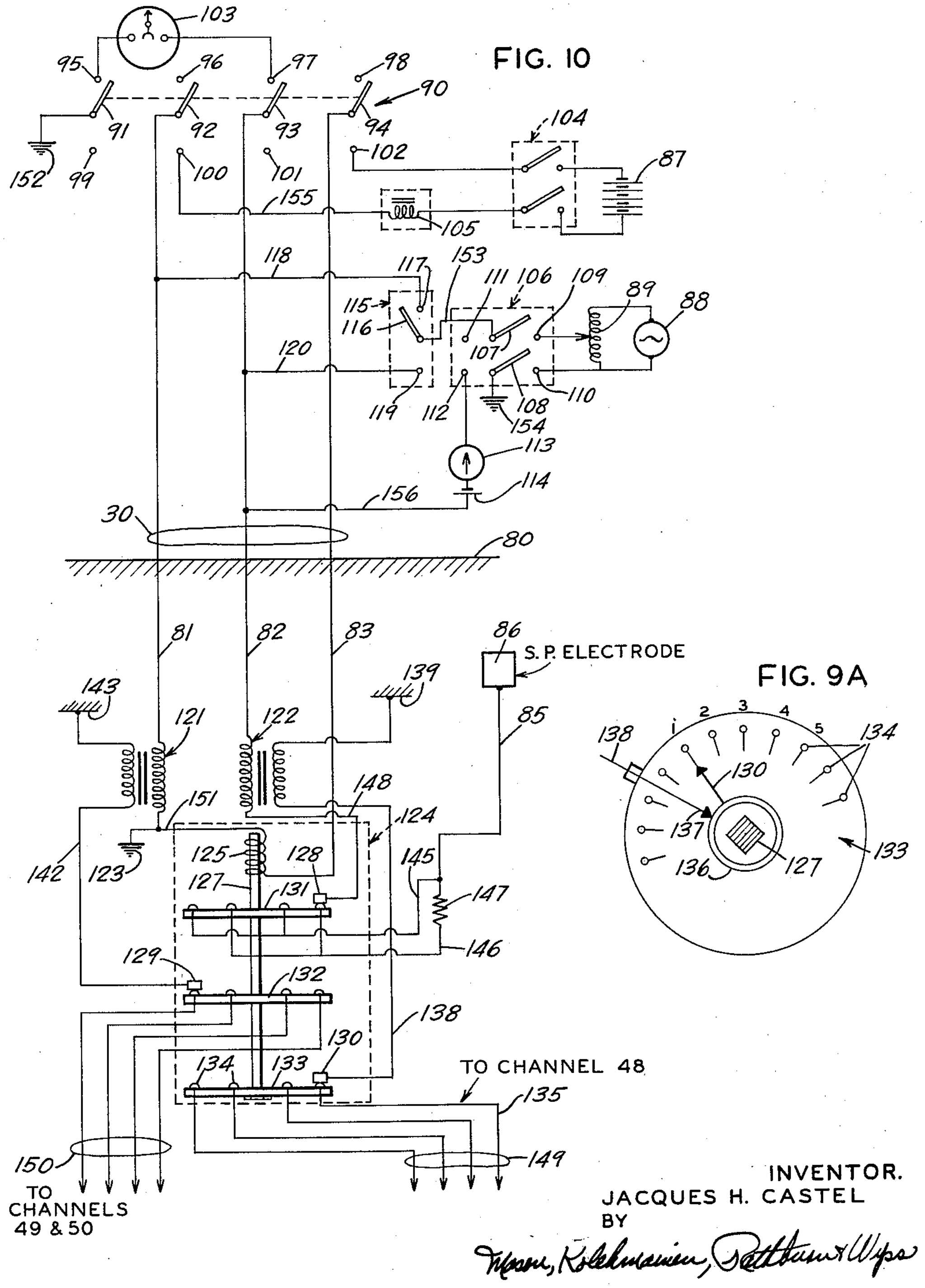
Fig. 9A is a detailed view showing one of the contact banks of the control switch shown in Fig. 9.
Fig. 10 is a circuit diagram showing the interrelation of the above surface and subsurface elements of the control system in the apparatus of Fig. 1.

Referring now to Figs. 8 to 10, inclusive, of the drawings, the control equipment for controlling the position of the gun or core taking tool in the bore and the sequence of firing the various sample taking projectiles is shown in somewhat schematic or diagrammatic fashion. Referring particularly to Fig. 10, the surface of the earth is indicated by the line 80, and it will be understood that all of the equipment appearing below this line is the equipment contained in the control unit 33 of the gun while the equipment shown above the line 80 constitutes the equipment which is located above the earth's surface and which is utilized to operate the sample taking apparatus in the desired fashion. As shown in Fig. 10, the supporting cable 30 includes three conductors 81, 82 and 83, which extend from the control apparatus at the surface of the earth to the control apparatus carried in the chamber 33. In addition, a fourth conductor 85 extends from the chamber 33, but this conductor does not extend to the surface of the earth but instead is connected to a specific potential (SP) electrode 86 which as indicated in Fig. 1, is in the form of a coil which surrounds the cable 30, and is located a short distance above the top of the sample taking tool. Preferably, the electrode is insulated from the sample taking tool and from the armor of the cable 30, and is approximately six inches in length. Since this electrode 86 is in contact with the liquid or mud contained in the bore, it constitutes a ground connection.

The control equipment which is located above the earth's surface comprises a source of direct current energy represented in Fig. 10 as a battery 87; a source of variable voltage alternating current energy constituting a generator 88 and a variable reactance 89; a main control switch 90 which is shown as constituting a double throw four pole switch including movable contact 91, 92, 93 and 94; a set of upper stationary contacts 95, 96, 97 and 98; and a set of lower contacts 99, 100, 101 and 102. Associated with the contacts 95 and 97 of the switch 90 is a sensitive galvanometer 103 which is employed in association with the SP electrode 86 to determine the position of the sampling tool in the borehole, as will be more fully described hereinafter. In order selecitvely to connect the two sources of energy to the conductors 81, 82, and 83, a single throw double pole switch 104 is provided, arranged to connect the battery 87 to the contacts 100 and 102 of the switch 90, and it will be observed that the direct current circuit thus established includes a counting relay which is indicated diagrammatically as an energizing coil 105. Associated with the source of alternating current is a double pole double throw switch 106 having a pair of movable contacts 107 and 108, a righthand pair of stationary contacts 109 and 110, and a lefthand pair of stationary contacts 111 and 112. Connected between the contact 112 of the switch 106 and the cable conductor 82 is a milliammeter 113 which is in series with a battery 114, the purpose of which will be more fully described hereinafter. Also, associated with the double pole double throw switch 106 is a single pole double throw switch 115 having a movable contact 116, an upper stationary contact 117 which is connected by a conductor 118 to the cable conductor 81, and a lower stationary contact 119 which is connected by a conductor 120 to the cable conductor 82. The purpose of the various control instrumentalities disposed above the surface of the earth will be described in detail after identification of the control equipment contained within the control housing 33 of the sample taking tool. As shown, this equipment contains a pair of transformers 121 and 122, the primary windings of which are respectively connected to the cable conductors 81, 82, the primary winding of the transformer 121 being grounded to the metallic casing of the control chamber 33 as indicated by the reference numeral 123. The ground connection for the primary winding of the transformer 122 is somewhat different and will be more fully described hereinafter. In addition to the transformers 121 and 122, the control equipment located within the control chamber 33 includes a stepping switch 124 having a direct current operating magnet 125. As shown somewhat diagrammatically in Fig. 9, the magnet 125 is adapted to operate a pawl and ratchet mechanism 126 which is connected to a central, rotatable shaft 127 carrying a plurality of contact arms 128, 129 and 130. These contact arms are adapted to move over a plurality of banks of contacts 131, 132, and 133. In Fig. 9A the contact bank 133 is shown as comprising an insulating disc on which a plurality of spaced contacts 134 are mounted. Preferably, there are eighteen contacts arranged annularly and the first sixteen of these contacts are connected by suitable conductors, one of which is shown in Fig. 9 as the conductor 135, to the sixteen detonators 57 mounted in the upper gun block 34. As shown in Fig. 9A, the shaft 127 carries a conducting ring 136 which is engaged by a suitable contact or brush 137 connected through a conductor 138, as shown in Fig. 10, to one side of the secondary winding of the transformer 122, the other side of the secondary winding being grounded as indicated by the reference numeral 139. Extending from the conducting ring 136 is the movable contact arm 130 which is adapted to sweep over the stationary contacts 134 as the rotatable shaft 127 is stepped from one position to another by energization of the magnet 125.

The contact bank 132 and its asociated movable contact 129 are similar to the contact bank 133 and the movable contact 130, the various contacts in the contact bank 132 being connected to the individual detonators 57 in the lower block 37 and the movable contact 129 being connected through a conductor 142 to one side of the secondary winding of the transformer 121, the other side of which is connected to ground as indicated by the reference numeral 143.

The various stationary contacts on the contact bank 131 which cooperate with the movable contact arm 128 are connected, as shown in Fig. 10, to the SP electrode 86, alternate contacts being directly connected thereto through conductors 145 and the cable conductor 85, and the intervening contacts being connected to the electrode through conductors 146, the resistor 147 and the cable conductor 85.

It will now be apparent that the ground connection for the primary winding of the transformer 122 is completed through a conductor 148 to the movable contact 128 of the switch bank 131, and alternately from the stationary contacts of this bank, either directly to the SP electrode or through the resistor 147 to the SP electrode. In Fig. 10, only a few of the conductors leading from the contact banks 132 and 133 have been shown, but it will be appreciated that the sixteen conductors from the contact bank 133 constitute a group of conductors 149, which, as shown in Fig. 8, extend into the conductor channel 48 in the upper gun block and are respectively connected to the various terminal blocks 56, which in turn extend the connections to the associated detonators 57. Similarly, the conductors from the contact bank 132 constitute a group of conductors 150 which, as shown in Fig. 8, pass through the conductor channel 49 in the upper block and into the conductor channel 50 in the lower block from whence they individually extend to the various terminal blocks 56 and the detonators 57 located in the lower block. In Fig. 9 of the drawings, the physical arrangement of the transformers 121 and 122, and the stepping switch 124 are shown rather diagrammatically, the majority of the electrical connections being omitted in order to simplify this figure of the drawings. For example, in Fig. 9, one terminal of the primary winding of the transformer 121 is shown connected to the cable conductor 81 and the other terminal of this primary winding is connected through the conductor 151 to one terminal of the magnet 125 of the stepping switch 124, the other terminal of the energizing winding being connected to the cable conductor 83, all as indicated diagrammatically in Fig. 10. Also, in Fig. 9, one terminal of the secondary winding of the transformer 121 is shown as being grounded to the casing of the control housing 33 at 143, and the other terminal of the secondary winding is connected through the conductor 142 to the conducting ring of the contact bank 132 corresponding to the conducting ring 136 of the contact bank 133 (Fig. 9A) through the associated brush contact. The connections from the stationary contacts of the bank 132 through the group of conductors 150 are omitted in Fig. 9 in order to simplify the drawings.

It is believed that having in mind the above description of the various elements and connections illustrated in Figs. 9 and 10, that a complete understanding of the operation of a core taking apparatus embodying the present invention may be had from a description of the sequential steps therein involved in carrying out a core taking operation.

When a core taking tool is first lowered into a borehole, the switch 90 will be in its upper closed position wherein the movable contacts 91 to 94, inclusive, respectively engage the stationary contacts 95 to 98, inclusive, and the other switches 104, 106, and 115 will be in other open circuit positions before starting to lower the core taking tool into the borehole. The stepping switch 124 will be set so that it occupies its first position with the movable contact arms engaging the No. 1 contact on each of the contact banks 131, 132, and 133. Under these conditions a surveying circuit is established which extends from the ground connection 152, the movable contact 91 and the stationary contact 95 of the switch 90, the sensitive galvanometer 103, the stationary contact 97 and the movable contact 93 of the switch 90 and by way of the cable conductor 82, the primary winding of the transformer 122, conductor 148, the movable switch arm 128, the No. 1 contact on the switch bank 131, the conductor 146, the resistor 147, and the cable conductor 85 to SP electrode 86. With this surveying connection established, a specific potential reading will be provided at the recording galvanometer 103 as the tool is lowered in the borehole and by comparison of this reading with a previously taken specific or natural potential curve, the sample taking tool may be lowered to the desired level in the borehole for sampling.

After the sampling tool has reached the desired position in the borehole, the switch 90 may be operated to its second position wherein the movable contacts 91 to 94, inclusive, respectively engage the stationary contacts 99 to 102, inclusive. In this position of the switch it will be observed that the sensitive galvanometer 103 is disconnected and, consequently, cannot be harmed by any electrical energy which appears on the various cable conductors during switching and firing.

Since the stepping switch is already in position No. 1 with the various movable contact arms 128, 129 and 130 engaging the No. 1 contacts on the associated switch banks, it is only necessary, in order to fire the No. 1 or lowermost sample taking projectile in the lower gun block, to operate the switch 115 to its uppermost position in which the movable contact 116 engages the stationary contact 117, and to then momentarily close the right-hand contacts of the switch 106. Under these conditions a firing circuit is established which extends from the adjustable terminal of the variable reactance 89 through the contacts 109 and 107 of the switch 106, the conductor 153, the contacts 116 and 117 of the switch 115, the conductor 118, the cable conductor 81, the primary winding of the transformer 121, and the ground connection 123, the circuit being completed through the ground connection 154 which extends through the contacts 108 and 110 of the switch 106 to the lower terminal of the variable reactance 89.

As soon as this circuit is completed, an alternating current voltage will be induced in the secondary winding of the transformer 121 and the detonator associated with the No. 1 contact on the switch bank 132 will be fired through a circuit which extends from the ground connection 143 through the secondary winding of the transformer 121, the conductor 142, the movable contact 129, the No. 1 contact on the switch bank 132 and through the associated conductor in the conductor group 150 to the detonator associated with the bottom one of the projectile assemblies mounted in the lower gun, the circuit being completed by reason of the fact that all of the detonators 57 are grounded to the lower block 37. Ignition of the detonator 57 causes explosive gas to pass through the passageway 58 into the associated explosive containing chamber 68 whereupon the main charge will be fired to drive the projectile out of the gun and into the side wall of the borehole, the retrieving cable 65 being extended and the charge containing cup 68 and the cable retaining member 70 being retained in the No. 1 bore 42 in the lower gun block 37.

If it is desired to take a second sample at this same position of the core sampling tool, it is necessary only to momentarily close the switch 104 which is effective to energize winding 125 of the stepping switch 124 through a circuit which extends from the upper terminal of the battery 87 through the upper contacts of the switch 104, the contacts 102 and 94 of the switch 90, the cable conductor 83, the winding 125, the conductor 151, the primary winding of the transformer 121, the cable conductor 81, the contacts 92 and 100 of the switch 90, and by way of a conductor 155 and the relay winding 105 through the lower contacts of the switch 104, to the other terminal of the battery 87. Since the energizing coil 105 of the counting relay is included in this energizing circuit, this counting relay, which may be of any conventional character, will operate to indicate that the stepping switch has been moved to its No. 2 position.

In order to provide a positive check to determine whether or not the stepping switch 124 has actually moved to its second position, the movable contacts of the switch 106 may be moved to the lefthand position so as to close a checking circuit which extends from the ground connection 154, the contacts 108 and 112 of the switch 106, the milliammeter 113, the battery 114, a conductor 156, the cable conductor 82, the primary winding of transformer 122, the conductor 148, the movable contact 128 associated with the switch bank 131, and from one of the stationary contacts of this switch bank, either through the conductor 145 and the cable 85 to ground at the SP electrode or through the conductor 146, the resistor 147 and the cable conductor 85 to ground at the SP electrode, depending upon the position occupied by the stepping switch 124. The indication produced at the milliammeter 113 will vary, depending upon whether the movable contact arm 128 is in engagement with an odd numbered or even numbered stationary contact and the contact bank 131, since in one case, the resistor 147 will be included in the checking circuit and in the other case it will not. Consequently, a comparison of the reading of the milliammeter 113 with the indication provided by the counting relay will positively show whether or not the stepping switch has moved to its next position in response to closure of the switch 104.

All of the sample taking projectiles in the lower gun may be fired in sequence merely by repeating the above described operation of the switch 104 to energize the stepping switch 124 and then closing the firing switches 106 and 115, and thereafter, the sample taking projectiles in the upper gun may be fired in sequence merely by shifting the switch 115 from its upper to its lower position so as to engage the source of alternating current to the cable conductor 82 rather than to the cable conductor 81. With the switch 115 in its lower position, the firing circuit extends from the adjustable terminal of the variable reactance 89 through the contacts 109 and 107 of the switch 106, the conductor 153, the contacts 116 and 119 of the switch 115, the conductor 120, the cable conductor 82, the primary winding of the transformer 122, the conductor 148 to movable contact arm 128 associated with the switch bank 131, one of the stationary contacts on this switch bank, and thence to ground at the SP electrode 86 either directly or through the resistor 147, depending upon the position of the stepping switch. The resistor 147 is of sufficiently low value that the firing of the detonator caps in the upper gun will be effected whether or not this resistor is included in the circuit of the primary winding of the transformer 122. When this transformer is thus energized, a firing circuit for the projectiles in the upper gun extends from the ground connection 139 through the secondary winding of the transformer 122, the conductor 138, the movable switch arm 130 associated with the switch bank 133 and through one of the conductors, for example the conductor 135 included in the conductor group 149 which extends along the conductor channel 48 to the detonators in the upper gun.

Upon certain types of operations, it may be desirable to lower the sample taking tool to a desired position as determined by the heretofore described natural potential logging means, and to then fire all of the projectiles contained in both the upper and lower blocks in order to obtain a plurality of samples from a predetermined strata. If this procedure is followed, the tool may then be withdrawn from the borehole and all of the sample taking barrels with samples contained therein will be withdrawn from the formation by the retrieving cables, and the sample containing barrels will then hang down the side of the blocks as the tool is withdrawn. Injury to these pendant sample containing barrels through excessive frictional contact with the side walls of the borehole will be prevented by the resilient bumpers 35, 38 and 40. In other types of operations, it may be desirable to fire one or more projectiles in a particular position of the tool and to then move the tool to either a higher or lower position in the borehole. In this type of operation it is desirable to fire the lowermost one of the projectiles in the lower block first and then to proceed sequentially upward so that when the tool is moved after firing some of the projectiles, the depending sample containing barrels which will be withdrawn from the formation upon movement of the tool, will not depend in front of and interfere with the firing of any of the other projectiles.

In the particular embodiment of the invention shown, sixteen sample taking projectiles 36 are mounted in each of the blocks 34 and 37, but it will be understood that the invention is not limited to any particular number of projectiles in either of the blocks. With the disclosed arrangement, however, the stepping switch 124 is provided with eighteen contacts in each of the banks 131, 132 and 133. The contacts in switch positions No. 17 and 18 are left blank so that when the stepping switch is in either of these positions, the position determining circuit provided by the millammeter 113 will give a positive indication that the switch is in one or the other of these positions. In case doubt arises as to the actual position of the stepping switch while the sampling tool is down hole, it is only necessary to successively open and close the switch 104 until these open circuit positions are reached. After the switch is located on open circuit position No. 18, the electric counter associated with the energizing winding 105 may be set to zero and the switch may then be operated in steps to the desired firing position.

While the sample taking apparatus thus far described has been found to operate in a highly satisfactory manner, it may be desirable to provide means for positioning the sampling tool in the borehole transversely thereof so that the relative position and the standoff distance of the projectile are as nearly as possible ideal. Such an ideal condition is attained when the axis of the projectile is perpendicular to the wall of the borehole and the standoff distance is a minimum. In accordance with the present invention, means are provided which are effective when a sampling tool reaches a desired position in the borehole to move the tool toward the wall from which the sample is to be taken, which positioning means may be retracted or retractable during lowering of the tool into the borehole or withdrawal of the tool from the borehole so that contact with the wall of the borehole of the sample taking projectiles before firing, or of the depending sample taking barrels which hang from the retrieving cables after firing will be minimized during such movements of the tool.

Figures 11, 12:
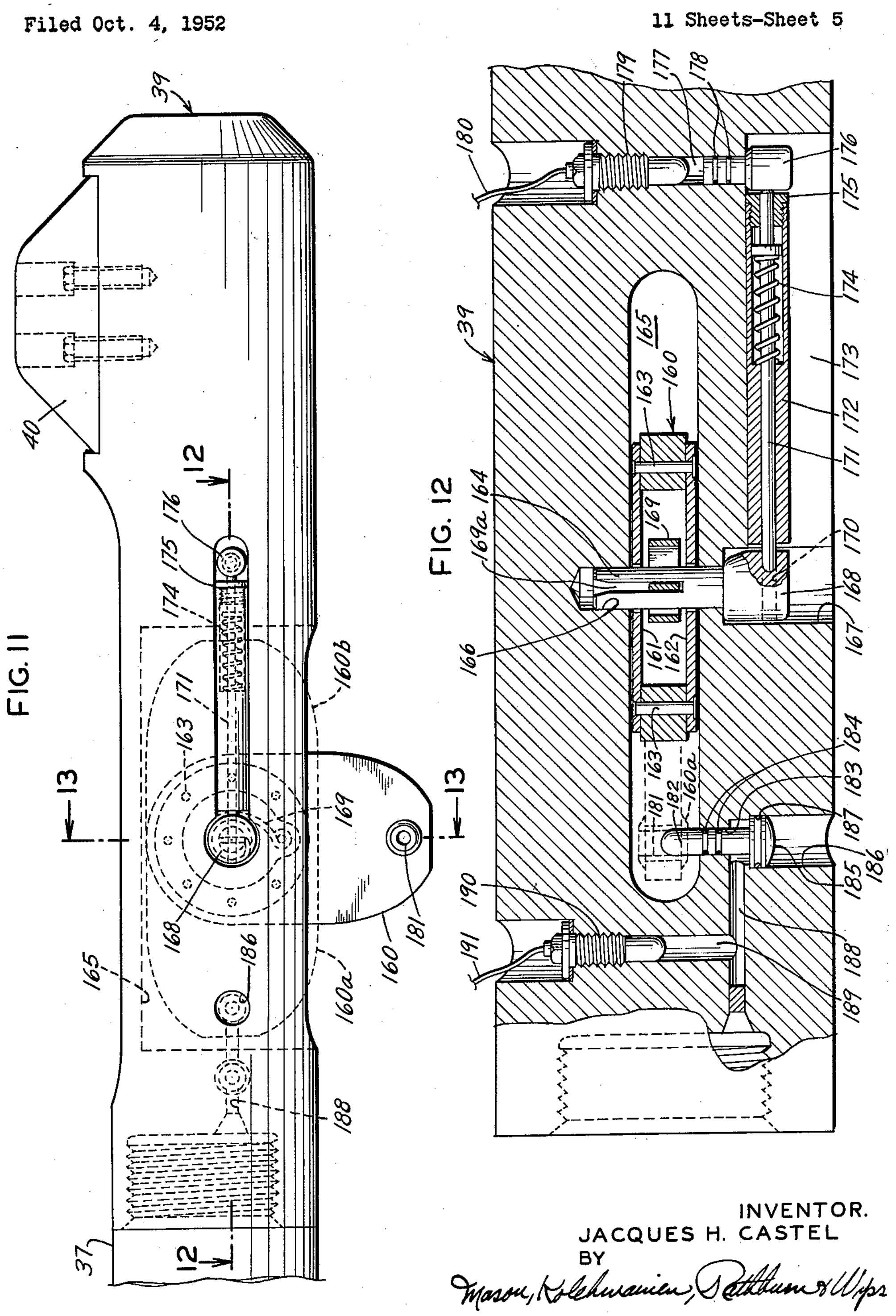
Fig. 11 is a side view on a somewhat larger scale showing the bull plug of the apparatus of Fig. 1, provided with the positioning means embodying the present invention.
Fig. 12 is a sectional view taken substantially along the line 12—12 of Fig. 11.
Figure 13:
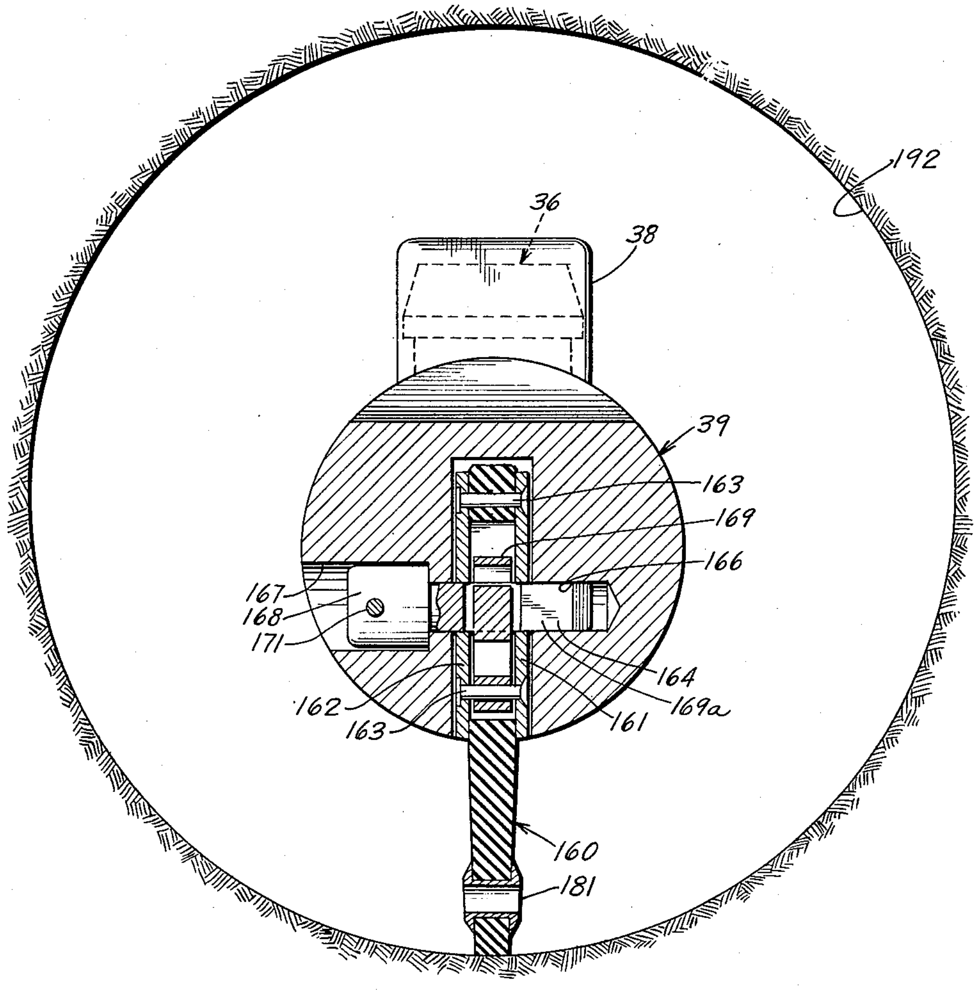
Fig. 13 is a sectional view taken substantially along the line 13—13 of Fig. 11, illustrating the manner in which the positioning means is effective to position the apparatus of Fig. 1 relative to the walls of the borehole during the sample taking operation.

In Figs. 11 to 13, inclusive, there is shown a positioning means embodying the present invention applied to the bull plug 39 of the sample taking apparatus shown in Figs. 1 to 10, inclusive, which positioning means comprises a resilient positioning member 160 adapted to contact the wall of the borehole when in its extended position, which positioning member 160 is preferably formed of rubber or similar resilient material supported between the pair of rigid plates 161 and 162, the three elements being suitably secured together by rivets 163. The plates 161 and 162, as shown best in Fig. 12, are journalled for rotation on a split shaft 164 which extends transversely across a slot or groove 165 that extends inwardly from the wall of the bull plug 39 in the side of the sampling tool opposite from the sample taking projectiles 36. The shaft 164 is journalled for rotation in a transversely extending aperture 166 having an enlarged outer end 167 for receiving an enlarged head portion 168 on the shaft 164. The groove 165 is of sufficient length and depth to permit movement of the resilient positioning member 160 from the extended position shown in full lines in Figs. 11 and 13 to the retracted positions indicated by broken lines and the reference numerals 160*a* and 160*b* in Fig. 11. Surrounding the split shaft 164 is a coil spring 169, one end of which extends into the slot 169*a* in the shaft, as shown in Fig. 12, and the other end of which is secured to one of the rivets 163 extending between the plates 161 and 162 as shown best in Fig. 13. The enlarged head 168 on the shaft 164 is provided with an aperture 170 for receiving one end of a slidable detent member 171 supported for longitudinal sliding movement in a bearing member 172 which is located in a longitudinally extending slot 173 in the bull plug 39. When the detent 171 is engaged in the aperture 170, the shaft 164 is held against rotation, and the coil spring 169 resiliently maintains the positioning member 160 in its extended position.

As shown in Figs. 11 and 12, the detent 171 is normally urged for movement out of engagement with the aperture 170 by a coil spring 174 which is disposed within a hollow end portion of the bearing 172, which hollow portion is closed by a threaded nut or closure member 175, through which the detent member 171 slidably extends. The detent member 171, however, is held against such movement by engagement with the head of a plug 176 positioned in one end of a transversely extending chamber 177 and the plug 176 is provided with suitable sealing rings 178 for sealing the chamber. The other end of the chamber 177 is closed by a suitable igniter or detonator 179 threaded into the end of the chamber and adapted to be electrically fired through an electrical circuit including a conductor 180.

Adjacent its outer end, the resilient positioning member 160 is provided with an aperture in which is located a hollow ferrule 181 adapted to receive a locking pin 182 when the resilient member 160 is in the retracted position 160*a*, the locking pin 182 serving to restrain the member 160 in this retracted position against the force exerted by the spring 169. The pin 182 is supported in a transversely extending aperture in the bull plug 39 which communicates with the slot 165 and which includes a reduced diameter portion 183 for receiving a similar reduced diameter portion of the pin 182 which carries a pair of sealing rings 184. The outer end of the pin 182 is provided with an enlarged head 185 which is positioned within an enlarged portion of the aperture in which the pin 182 is supported, this head 185 being spaced from an end wall of this enlarged portion to provide a chamber 186 which is sealed by a suitable sealing ring 187 carried on the head portion 185. Communicating with the chamber 186 is a longitudinally extending passageway 188 which also communicates with a transversely extending detonating chamber 189 into which is threaded a suitable detonator or igniter 190 adapted to be connected, as for example, by a conductor 191 to a suitable source of electric current.

When the sample taking apparatus provided with the positioning means disclosed in Figs. 11 to 13, inclusive, is being made ready for lowering into a borehole, the positioning pin 171 will be located with its lefthand end as viewed in Fig. 12, extending into the aperture 170 to lock the shaft 164 and the plug 176 will be forced into the passageway 177 to the position shown in Fig. 12 so as to hold the pin 171 in the desired locking position. The positioning member 160 will then be rotated against the force of the spring 169 to the retracted position represented by the broken line 160*a* and the locking pin 182 will be forced into the position shown in Fig. 12 so that the innermost end thereof extends in the ferrule 181, thereby locking the positioning member 160 in its retracted position. The detonators 179 and 190 will then be threaded into their respective chambers and the electrical connections made thereto. It will be understood that the detonators 179 and 190 may be connected for firing in any suitable manner, but preferably the conductors 180 and 191 extend to suitably located stationary contacts on one of the contact banks of the stepping switch 124. For example, the first contact on the contact bank 132 may be connected to the detonator 190 and the seventeenth or eighteenth contact on the contact bank 133 may be connected to the detonator 179.

After the sample taking tool has been lowered to the desired position in the borehole as determined by the heretofore described natural potential logging means, the switch 115 may be operated to close the contacts 116 and 117, and thereafter the switch 106 may be closed on its righthand contacts to fire the detonator 190 in the bull plug. The explosive gases thus produced in the detonator chamber 189 are communicated through the passageway 188 to the chamber 186 whereupon the locking pin 182 will be expelled from the bull plug and the positioning member 160 will be moved by the spring 169 to the extended position shown in full lines in Figs. 11 and 13. As clearly shown in this latter figure, the positioning means in its extended position will engage one wall of the borehole represented by the circle 192, and if the gun is too close to the wall opposite the sample taking tool, the positioning member 160 will move the gun so as to bring the sample taking tools or projectiles to a proper standoff distance from the side of the borehole from which the sample is to be taken.

After the desired number of samples have been taken, the stepping switch member 124 may be operated so that the stationary contact on the contact bank 133 to which the detonator 179 is connected is engaged by the movable arm 130, and thereafter the switches 115 and 106 may be operated to fire the detonator 179. Firing this detonator expels the plug 176 and permits the positioning pin 171 to move in a righthand direction so as to release the shaft 164. After the shaft has been thus released, the spring 169 is ineffective and the positioning member 160 will move by gravity to the dotted line position 160*b* of Fig. 11 so that it will not engage the wall of the borehole during withdrawal of the sampling tool.

If desired, the locking pin 182 and the detonator 190 may be omitted, in which case the positioning member 160 will be resiliently maintained in its extended position during lowering of the sample taking apparatus into the borehole. While this has some disadvantages, it will be apparent that downward movement of the apparatus in the borehole will tend to move the positioning member 160 toward the dotted line position 160*a*, and since the resilient bumpers 35, 38 and 40 are on the opposite side of the gun from the positioning member 160, these bumpers will serve to protect the sample taking tools 36 from damage through contact with the wall of the borehole. Release of the positioning member 160 after the desired number of samples have been taken may be accomplished as previously described through firing of the detonator 179 so that during withdrawal of the apparatus, the sample taking barrels which will now be hanging from the retrieving cables will not be continuously in rubbing engagement with the borehole wall.

In the embodiment of the invention shown in Figs. 14 to 17, inclusive, the positioning means comprises an elongate pivoted arm 192 disposed in a longitudinally extending slot 193 in the bull plug 39, the lower end of the arm 192 being curved, as shown, and the bull plug having a transversely extending aperture 194 for receiving this curved end. Adjacent the upper end of the arm 192, the bull plug 39 is cut away as indicated by reference numerals 195 in Fig. 15 to receive a pin or shaft 196 which extends laterally across the slot 193 and through a suitable aperture in the arm 192 whereby the arm 192 is mounted for pivotal movement. Surrounding the shaft 196 on opposite sides of the arm 193 is a divided coil spring 197, the free ends of which extend into suitable positioning holes 198 in the bull plug 39, the central portion 199 of the spring underlying the arm 192 so as normally to urge the arm for pivotal movement from the solid line position shown in Fig. 14 to the broken line position identified by the reference numeral **192*a***.

Adjacent its lower end, the arm 192 carries a yoke 200 which straddles the arm and is secured thereto by a cross pin 201. As shown, the yoke 200 includes a plug portion 202 which extends into and seals a transversely extending chamber 203, the opposite end of which is closed by a detonator 204. In order to maintain the plug portion 202 in the position shown in Fig. 14 against the force of the spring 197, a shear pin 205 is provided which, as shown best in Fig. 17, extends through suitable apertures in the bull plug 39 and in the plug 202. The end portion 205*a* of the shear pin 205 may be bent over, as shown, to secure the shear pin in position after it has been inserted into the desired position.

Figure 14:
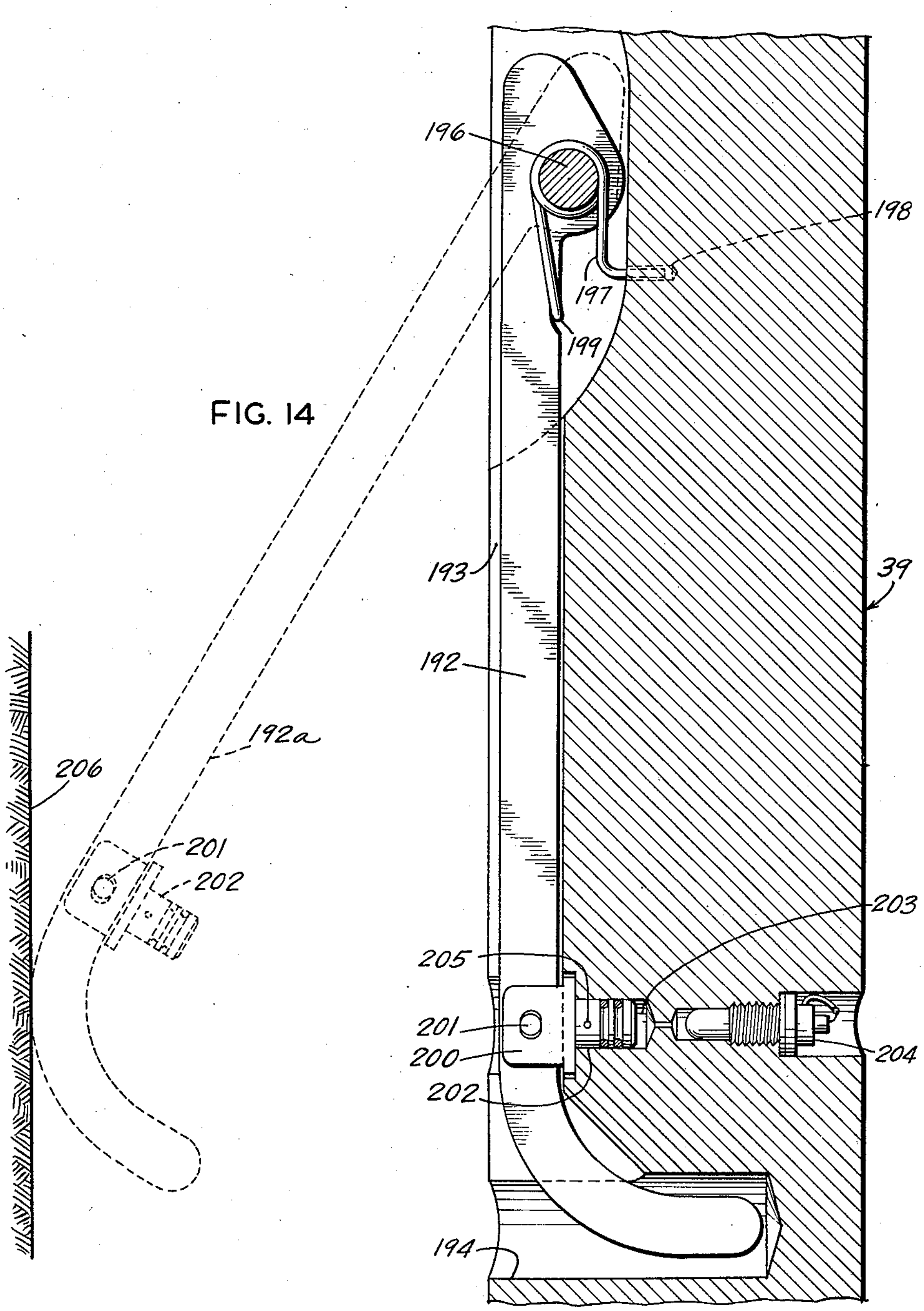
Fig. 14 is a longitudinal sectional view showing a bull plug embodied with a somewhat different form of positioning means.

It will be understood that the arm 192 will be held in its retracted position by the shear pin 205 and the plug 202 when the sample taking apparatus is being lowered into the borehole, and when the proper position in the borehole is reached it is only necessary to fire the detonator 204 which will expel the plug 202 either wholly or partially from the chamber 203 and thereby shear the pin 205, whereupon the positioning arm 192 will move to the extended broken line position shown in Fig. 14 so as to engage the wall 206 of the borehole and move the sample taking apparatus to the desired lateral position in the borehole. In this embodiment of the invention, no means are provided for releasing the spring 197 during withdrawal of the apparatus from the borehole, but it will be appreciated that, if desired, the blocking and releasing arrangement provided in the previously described embodiment of the invention for releasing the shaft 164 could be provided in the embodiment shown in Fig. 14 merely by a slight change in the arrangement of the shaft 196 and the spring 197.

In the embodiment of the invention shown in Figs. 18 to 20, inclusive, the positioning means is mounted on a mandrel 206 which extends between and threadedly engages the lower end of the upper block 34 and the upper end of the lower block 37. Extending along one side of the mandrel 206 is a resilient strip or leaf spring 207 which supports intermediate its ends a resilient wall engaging bumper member 208. The opposite ends of the spring 207 are connected, as shown in Fig. 18, to a pair of collar members 209 and 210 which surround the mandrel 206 and are slidable therealong.

Referring particularly to Fig. 19, the collar 209 is provided with an aperture 209*a* therein for receiving a locking pin 211, the end of which extends into and seals a transversely extending chamber 212 in the mandrel. Communicating with the chamber 212 is a longitudinally extending passageway 213, the lefthand end of which is sealed by a detonator 214. A suitable conductor 215 leading from the detonator 214 extends through an aperture 216 in one wall of the upper block 34 which leads to the conductor channel 48 in the upper block. Surrounding the mandrel 206 adjacent the collar 209 is a compression spring 217, one end of which engages the collar 209 and the other end of which engages a stop collar 218 surrounding the mandrel 206 and secured thereto by suitable screws 219.

The collar 210 is urged in a left hand direction, as viewed in Fig. 18 by a compression spring 217*a* and is provided with a locking pin 220 similar to the pin 211 which extends into a transverse aperture in the mandrel similar to the aperture 212 and which communicates with a longitudinal passageway 221 that is closed by a detonator 222.

In order to extend the electric conductors for firing the sample taking tools in the lower block, and for firing the detonator 222, a pair of conduits 223 and 224 are provided which extend alongside the mandrel 206, the conduit 223 communicating with an aperture 225 in the upper block which leads from the conductor channel 48 therein, and the conduit 224 communicating with an aperture 226 in the lower block which communicates with the conductor channel 50 therein. The conductor 227 leading to the detonator 222 extends from this conductor channel through a suitable aperture 228 in the wall of the lower block. The conductor conduits 223 and 224 are secured together and supported from the mandrel 206 by means of a block 229 (Fig. 20) which is secured to the mandrel by suitable screws 230 and is provided with chamfered outer ends 231 adapted to engage the conduits 223 and 224. The conduits are held securely in engagement with the block 229 by means of a yoke 232 which surround the conduits and straddles the block 229, the yoke being secured to the block by a suitable fastening member or bolt 233.

When the sample taking apparatus is being lowered in the borehole, the collars 209 and 210 will be held in the respective positions shown in full lines in Fig. 18 by means of the locking pins 211 and 220, respectively, and the wall engaging member or bumper 208 will thus be held in retracted position shown in full lines. As soon as the sample taking apparatus has reached the desired position in the borehole, an energizing circuit may be established for the detonator 222 either by operation of the control switch 124 or otherwise, and upon firing of the detonator 222, the locking pin 220 will be expelled from the mandrel and the collar 210, whereupon the spring 217*a* will move the collar 210 to the broken line position 210*a* in which the collar 210 engages a stop collar 235 which is secured to the mandrel 206 by suitable screws 236. This movement of the collar 210 will flex the leaf spring 207 and move the wall engaging member 208 to the extended broken line position 208*a* shown in Fig. 18 so as properly to position the sample taking apparatus in the borehole for firing of the sample taking projectiles.

When the desired number of samples have been taken, the positioning means comprising the leaf spring 207 and the bumper member 208 may be returned to a retracted position merely by firing the detonator 214. When this detonator is fired, the locking pin 211 will be expelled from the mandrel and the collar 209, whereupon the spring 217 will move the collar 209 to the broken line position 209*a* of Fig. 18, in which position the collar 209 engages the lower end of the upper block 34. Since the collar 210 is restrained by the fixed collar 235, this movement of the collar 209 returns the spring from the extended position 207*a* to the broken line retracted position 207*b* and the bumper member 208 occupies the broken line retracted position 208*b* in Fig. 18. Thus, the sample taking apparatus may be withdrawn from the borehole with the positioning means in a retracted position so that engagement of the sample taking barrels with the borehole wall is minimized.

In the embodiment of the invention shown in Figs. 21 and 22, the positioning means is shown as being mounted on a mandrel 240 which is threadedly connected to the bottom of the bull plug 39 and is preferably provided at its lower end with a bumper member 241. In this embodiment of the invention, the positioning means comprises a plurality of, preferably three, equally spaced and similarly formed leaf springs 242, 243, and 244, each of which carries a bumper member 245, 246 and 247, respectively, the bumper members preferably being formed of rubber-like material molded onto the springs. As shown, the leaf springs are connected at their opposite ends to a pair of slip rings or slidable collars 248 and 249, the springs being so formed and stressed that they normally tend to move the collars toward each other so that the bumper members are maintained in extended positions determined by the location of a pair of stop collars 250 and 251 which are adjustably secured to the mandrel 240 by suitable set screws 253. As shown in Fig. 22, the bumper members 245, 246 and 247, when held in their extended positions by the leaf springs, provide an overall outer diameter which is slightly smaller than the inside diameter of the borehole represented by the circle 254. When the sample taking apparatus is being lowered into the borehole, engagement of the bumper members with the wall of the borehole will cause flattening of the springs 242, 243 and 244, and the consequent elongation of the springs will be taken up by movement of the collar or slip ring 248 from the full line position toward the dotted line position indicated in Fig. 21, the collar 251 during this movement of the apparatus preventing upward movement of the collar 249. Similarly, when the sample taking apparatus is being withdrawn from the borehole, movement of the collar 249 from the full line position toward the broken line position shown in Fig. 1 is effected by flattening of the springs through contact with the wall of the borehole.

As will be apparent from Fig. 22, the three spring arms and the bumper members function in this embodiment of the invention to practically center the apparatus in the borehole, which provides satisfactory standoff distance. Furthermore, it will be noted that the spring arms 242 and 244 form a pocket in which the sample containing barrels hang on their respective retrieving cables, thus protecting these barrels when the apparatus is being withdrawn from the borehole. The collars 250 and 251 may be adjusted toward or away from each other along the mandrel 240 in order to provide for different diameter boreholes.

In the embodiment of the invention shown in Figs. 23, 24, and 25, the positioning means which is again mounted on the bull plug 39, comprises merely a pair of resilient fins 255 and 256 which are supported in channel members 257 and 258, respectively, the channel members being positioned in suitable grooves 259 and 260 in the bull plug and secured therein by cap screws 261. The fins 255 and 256 are formed of rubber or other easily destructible material so that they will be pulled off in case an obstruction is encountered in the borehole. As shown best in Fig. 25, the positioning fins are located on the bull plug on the opposite side from the position of the sample taking tools 36 in the gun and are disposed in substantially equiangular relation to the axis of the sample taking projectiles. The positioning fins thus function to hold the sample taking projectiles at a proper standoff distance from the opposite wall of the borehole and in substantially perpendicular relation to this wall.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by United States Letters Patent is:

1. A sample taking tool comprising a hollow projectile member having a closed rear end, perforated side walls, and an open front end, a cutting ring having a minimum internal diameter substantially equal to that of said projectile member and an external diameter greater than said projectile member, said cutting ring including a rearwardly facing face positioned in coaxial relation to the forward end of said projectile member and adapted for abutting engagement with the forward end of said projectile member, and shearable means securing said ring on said projectile member with said face in spaced relation to said forward end of said projectile member.

2. A sample taking tool comprising a hollow projectile member having a closed rear end, perforated side walls and an open front end, a cutting ring having a minimum internal diameter substantially equal to that of said projectile member and an external diameter greater than said projectile member, said cutting ring including a rearwardly facing shoulder adapted for abutting enagagement with the forward end of said projectile member, flange means extending rearwardly from said shoulder for loosely encompassing said projectile member, and shearable means for connecting said flange means to said projectile member with the forward end of said projectile member in spaced relation to said shoulder.

3. A sample taking tool comprising a hollow projectile member having a closed rear end, perforated side walls and an open front end, a cutting ring having a minimum internal diameter substantially equal to that of said projectile member and an external diameter greater than said projectile member, said cutting ring including a rearwardly facing shoulder adapted for abutting engagement with the forward end of said projectile member, flange means extending rearwardly from said shoulder for loosely encompassing said projectile member, said flange means and said projectile member having alignable apertures therein, and shearable pin means in said alignable apertures for positioning said ring on said projectile member with said shoulder in spaced relation to said forward end of said projectile member.

4. A sample taking tool assembly comprising a block adapted to be raised and lowered in a borehole, said block having a bore extending transversely therethrough, the diameter of which decreases in at least one step from front to rear, a hollow projectile in said bore having a closed rear end and an open front end and adapted to be projected from said bore into a formation to obtain a sample thereof, a cup-like charge receiving container in said bore having its open front end secured to said closed end of said projectile and having an apertured rear wall engageable with said step in said bore, a flexible retrieving cable disposed in said container, a cable-retaining member disposed in said container adjacent the rear wall thereof, means for securing the opposite ends of said cable to said closed end and said retaining member respectively, and means extending into the rear end of said bore and through said apertured wall for engaging said retaining member to clamp said rear wall between said retaining member and said step and secure said retaining member in said bore.

5. A sample taking tool assembly comprising a block adapted to be raised and lowered in a borehole, said block having a bore extending transversely therethrough, the diameter of which decreases in at least one step from front to rear, a hollow projectile in said bore having a closed rear end and an open front end and adapted to be projected from said bore into a formation to obtain a sample thereof, a cup-like charge receiving container having its open front end secured to said closed end of said projectile and having an apertured rear wall engageable with said step in said bore, a flexible retrieving cable disposed in said container, a cable-retaining member disposed in said container adjacent the rear wall thereof, means for securing the opposite ends of said cable to said closed end and said retaining member respectively, said retaining member including a threaded aperture alignable with said aperture in said rear wall of said container, and threaded means extending into the rear end of said bore engageable in said threaded aperture for clamping said rear wall between said retaining member and said step to secure said retaining member and said container in said bore.

6. A sample taking tool assembly comprising a block adapted to be raised and lowered in a borehole, said block having a bore extending transversely therethrough, the diameter of which decreases in at least one step from front to rear, a hollow projectile in said bore having a closed rear end and an open front end and adapted to be projected from said bore into a formation to obtain a sample thereof, a cup-like charge receiving container having its open front end secured to said closed end of said projectile and having an apertured rear wall engageable with said step in said bore, a flexible retrieving cable disposed in said container, a cable-retaining member disposed in said container adjacent the rear wall thereof, means for securing the opposite ends of said cable to said closed end and said retaining member respectively, and means extending into the rear end of said bore and through said apertured wall for engaging said retaining member to clamp said rear wall between said retaining member and said step and secure said retaining member and said container in said bore, said projectile being separable from said container upon explosion of a charge in said container.

7. A sample taking tool assembly comprising a block adapted to be raised and lowered in a borehole, said block having a bore extending transversely therethrough, the diameter of which decreases in at least one step from front to rear, a hollow projectile in said bore having a closed rear end and an open front end and adapted to be projected from said bore into a formation to obtain a sample thereof, a cup-like charge receiving container having its open front end secured to said closed end of said projectile and having an apertured rear wall engageable with said step in said bore, a flexible retrieving cable disposed in said container, a cable-retaining member disposed in said container adjacent the rear wall thereof, means for securing the opposite ends of said cable to said closed end and said retaining member respectively, means extending into the rear end of said bore and through said apertured wall for engaging said retaining member to clamp said rear wall between said retaining member and said step and secure said retaining member and said container in said bore, said block having a detonating chamber therein and a passageway extending from said chamber to said bore, said container having an aperture alignable with said passageway, cooperating means on said retaining member, said container and said step for insuring alignment of said last mentioned aperture and said passageway, and detonator means in said chamber effective through said passageway to ignite a charge in said container.

8. A projectile apparatus comprising a block adapted to be raised and lowered in a borehole, said block having a bore extending transversely therethrough and having a detonating passage communicating with said bore, a projectile assembly including a projectile body and a cup-like charge receiving container having its open end secured to the rear end of said body, an explosive charge in said container, and means for securing said container in said bore with said container contiguous to said detonating passageway whereby detonation of said charge may be effected, said projectile body being separable from said container by explosion of said charge.

9. A projectile apparatus comprising a block adapted to be raised and lowered in a borehole, said block having a bore extending transversely therethrough and having a detonating passage communicating with said bore, a projectile assembly including a projectile body and a cup-like charge receiving container having its open end secured to the rear end of said body, an explosive charge in said container, and means for securing said container in said bore with said container contiguous to said detonating passageway, said container having an aperture in one wall thereof, and cooperating means associated with said container and a wall of said bore for insuring alignment of said aperture and said detonating passageway whereby said charge may be detonated through said passageway.

10. A projectile apparatus comprising a block adapted to be raised and lowered in a borehole, said block having a bore extending transversely therethrough and having a detonating passage communicating with said bore, a projectile assembly including a projectile body and a cup-like charge receiving container having its open end secured to the rear end of said body, an explosive charge in said container, and means for securing said container in said bore with said container contiguous to said detonating passageway, said container having an aperture in one wall thereof, a frangible cover for sealing said aperture to retain said charge in said container prior to insertion of said assembly into said bore, and cooperating means associated with said container and a wall of said bore for insuring alignment of said aperture and said detonating passage whereby said charge may be detonated through said passageway and said frangible cover.

11. A sample taking apparatus comprising a block adapted to be raised and lowered in a borehole, said block having a bore extending transversely therethrough, a hollow projectile in said bore having a closed rear end and an open front end adapted to be driven into a formation to obtain a sample thereof, a flexible retrieving cable secured at one end thereof to said closed end of said projectile, a cable retaining member secured to the other end of said cable, and a cup-like charge receiving container in said bore having its open end secured to said closed end of said projectile and enclosing both said cable in coiled form and said retaining member, said container having an opening therein whereby said retaining member is accessible from the rear of said container, means extending into the rear end of said bore and through said opening in said container for securing said retaining member to the block, and said projectile being separable from said container upon explosion of a charge in said container.

References Cited in the file of this patent

UNITED STATES PATENTS

| | | |
|---|---|---|
| Re. 20,120 | Schlumberger | Sept. 29, 1936 |
| 2,055,506 | Schlumberger | Sept. 29, 1936 |
| 2,155,322 | McCullough | Apr. 18, 1939 |
| 2,203,265 | Kniss | June 4, 1940 |
| 2,250,056 | Alexander | July 22, 1941 |
| 2,276,544 | Miller | Mar. 17, 1942 |
| 2,288,210 | Schlumberger | June 30, 1942 |
| 2,313,369 | Spencer | Mar. 9, 1943 |
| 2,327,362 | McDonald et al. | Aug. 24, 1943 |
| 2,331,058 | Stick | Oct. 5, 1943 |
| 2,338,872 | Robidoux | Jan. 11, 1944 |
| 2,381,081 | Schlumberger | Aug. 7, 1945 |
| 2,511,408 | Lebourg | June 13, 1950 |
| 2,558,452 | Mennecier | June 26, 1951 |
| 2,599,040 | Bannister | June 3, 1952 |
| 2,612,346 | Nelson | Sept. 30, 1952 |
| 2,618,343 | Conrad | Nov. 18, 1952 |
| 2,689,007 | Beyer et al. | Sept. 14, 1954 |

OTHER REFERENCES

Schlumberger Side Wall Sampling (pamphlet), page 1, received in Patent Office Feb. 9, 1939.